(12) United States Patent
Sammarome et al.

(10) Patent No.: US 10,576,935 B2
(45) Date of Patent: Mar. 3, 2020

(54) AUTOMOTIVE HEADLIGHT DEFOGGING/DEFROSTING

(71) Applicant: FCA ITALY S.P.A., Turin (IT)

(72) Inventors: Angelo Sammarome, Turin (IT); Emanuele Girotto, Turin (IT); Roberto Beduschi, Turin (IT)

(73) Assignee: FCA ITALY S.p.A., Turin (IT)

( * ) Notice: Subject to any disclaimer, the term of this patent is extended or adjusted under 35 U.S.C. 154(b) by 0 days.

(21) Appl. No.: 16/318,027

(22) PCT Filed: Dec. 15, 2017

(86) PCT No.: PCT/IB2017/058003
§ 371 (c)(1),
(2) Date: Jan. 15, 2019

(87) PCT Pub. No.: WO2018/109738
PCT Pub. Date: Jun. 21, 2018

(65) Prior Publication Data
US 2019/0337485 A1    Nov. 7, 2019

(30) Foreign Application Priority Data

Dec. 15, 2016 (EP) ..................................... 16204296

(51) Int. Cl.
*B60S 1/02* (2006.01)
*F21S 45/60* (2018.01)
(Continued)

(52) U.S. Cl.
CPC .......... *B60S 1/026* (2013.01); *B60H 1/00271* (2013.01); *F21S 45/43* (2018.01); *F21S 45/60* (2018.01); *B60Q 1/04* (2013.01)

(58) Field of Classification Search
CPC . B60S 1/026; F21S 45/43; F21S 45/60; F21S 45/20; F21S 45/33; B60H 1/00271;
(Continued)

(56) References Cited

U.S. PATENT DOCUMENTS 4,280,330 A   7/1981  Harris et al.
5,980,074 A   11/1999 Hwang
(Continued)

FOREIGN PATENT DOCUMENTS

CN   102009640 B   5/2012
DE     3138360 A1  4/1983
(Continued)

OTHER PUBLICATIONS

International Search Report and Written Opinion issued in PCT/IB2017/058003, dated Mar. 14, 2018; ISA/EP.
(Continued)

*Primary Examiner* — Peggy A Neils
(74) *Attorney, Agent, or Firm* — Harness, Dickey & Pierce, P.L.C.

(57) ABSTRACT

Motor vehicle comprising headlights and an air conditioning system fluidically connected to the headlights for supplying an air flow thereto, and comprising an electric fan to generate the air flow, an electric heater to heat the air flow generated by the electric fan, a sensory system to measure air temperature and moisture inside the headlights, an electric heater and an electric fan arranged inside each headlight, and an electronic control unit connected to the sensory system to receive the measured quantities, to the electric fan and the electric heater of the air conditioning system, and the electric heaters and the electric fans in the headlights to control operation thereof. The electronic control unit is further designed to carry out one or more of the following headlight defogging/defrosting operations based on air temperature and moisture inside the headlights:
  a) operating in a timed manner, with internal combustion engine off, the electric fans in the headlights;
  b) operating in a timed manner, with internal combustion engine off, the electric heater of the air conditioning system and, simultaneously, the electric fan of the air conditioning system or of the electric fans in the headlights; and (Continued)

c) operating in a timed manner the electric heaters in the headlights.

7 Claims, 1 Drawing Sheet

(51) Int. Cl.
  *B60H 1/00* (2006.01)
  *F21S 45/43* (2018.01)
  *B60Q 1/04* (2006.01)

(58) Field of Classification Search
  CPC ........ B60H 2001/2253; B60H 1/00878; B60Q 1/04
  See application file for complete search history.

(56) References Cited

U.S. PATENT DOCUMENTS

| | | | |
|---|---|---|---|
| 9,879,841 | B2 | 1/2018 | Lee |
| 10,065,476 | B2* | 9/2018 | Bonneau ............ B60H 1/00785 |
| 10,124,649 | B2 | 11/2018 | Patel |
| 2011/0261578 | A1 | 10/2011 | Kudelka et al. |
| 2015/0298523 | A1 | 10/2015 | Patel |
| 2017/0102121 | A1 | 4/2017 | Lee |
| 2018/0149334 | A1* | 5/2018 | Muehlbauer ............ F21S 45/33 |
| 2018/0156412 | A1* | 6/2018 | Carnarius ............... F21S 45/33 |
| 2018/0156413 | A1* | 6/2018 | Tuley ...................... F21V 31/03 |

FOREIGN PATENT DOCUMENTS

| | | |
|---|---|---|
| DE | 102006036058 A1 | 2/2008 |
| DE | 102010052809 A1 | 7/2011 |
| DE | 102015206671 A1 | 10/2015 |
| DE | 102015002246 A1 | 8/2016 |
| DE | 202016105615 U1 | 11/2016 |
| FR | 2804745 A1 | 8/2001 |
| WO | WO-2005116522 A1 | 12/2005 |
| WO | WO-2016060853 A1 | 4/2016 |

OTHER PUBLICATIONS

International Preliminary Report on Patentability issued in PCT/IB2017/058003, dated Dec. 12, 2018.

\* cited by examiner

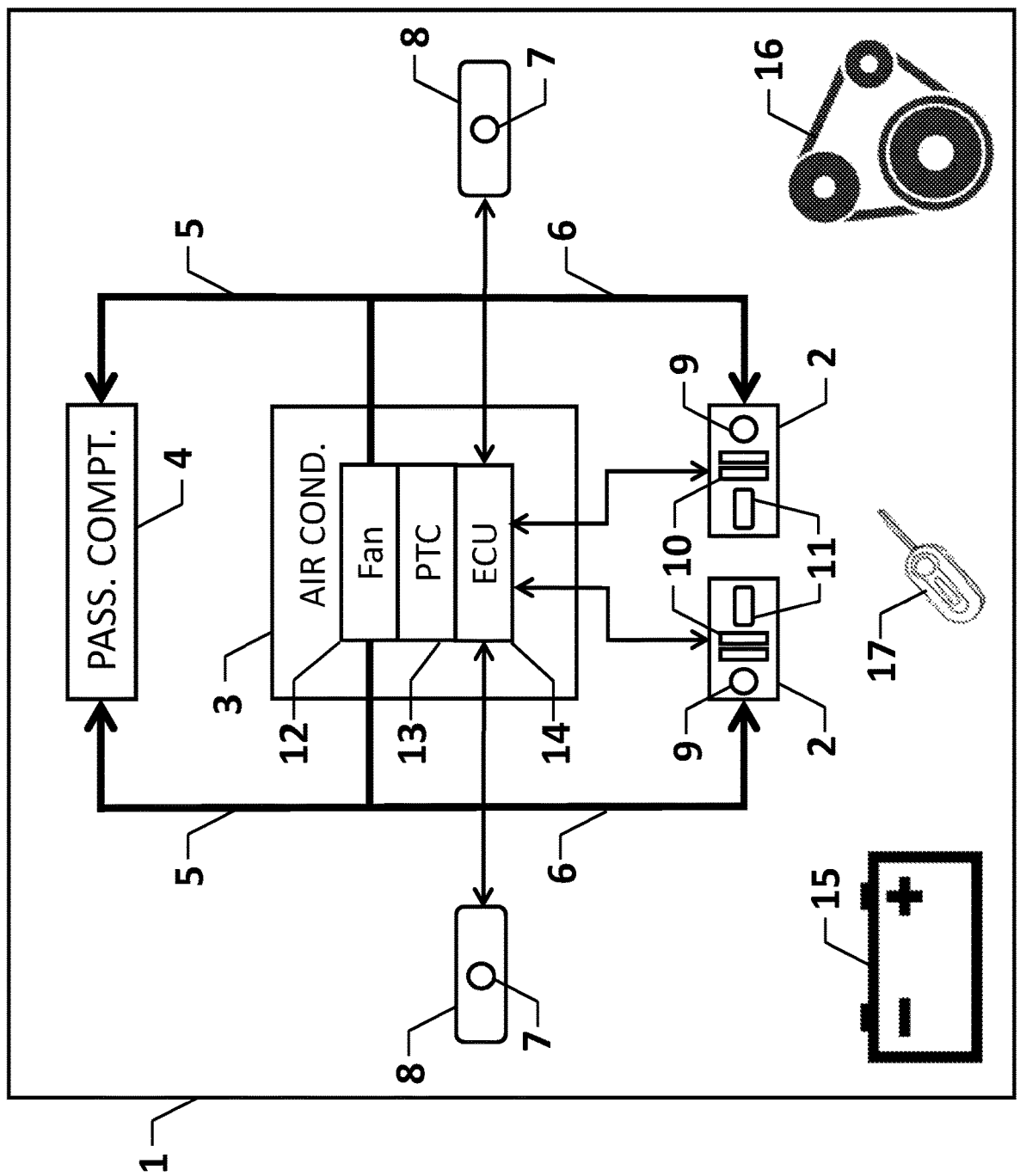

AUTOMOTIVE HEADLIGHT DEFOGGING/DEFROSTING

CROSS-REFERENCE TO RELATED APPLICATIONS

This application is a U.S. National Phase Application under 35 U.S.C. 371 of International Application No. PCT/IB2017/058003 filed on Dec. 15, 2017, which claims the benefit of European Patent Application No. 16204296.4 filed on Dec. 15, 2016. The entire disclosures of the above-identified applications are incorporated herein by reference.

TECHNICAL FIELD OF THE INVENTION

The present invention relates in general to automotive external front lighting devices, also known as headlights or optical groups, and in particular to automotive headlight defogging (demisting)/defrosting, namely removal or prevention of formation of liquid or solid condensate inside the automotive headlights.

PRIOR ART

As known, fogging (misting) and frosting of automotive headlights, i.e. formation of liquid or solid condensate on an inner and/or outer surface of lenses of the headlights, occur under particular high-humidity and low-external-temperature weather conditions, and can adversely, and even remarkably, affect performance of the automotive headlights.

The various solutions that have been proposed to overcome this problem may be substantially divided into two main categories, depending on how the defogging and defrosting are obtained.

The first category includes those solutions in which the headlights are defogged and defrosted by a forced air flow produced by the movement of the motor vehicle (motor vehicle dynamic phase).

This first category includes, by way of example, the solutions described in U.S. Pat. No. 5,980,074 and US 2011/0261578 A1, wherein the headlights are provided with ventilation openings through which external air can flow into the headlights and the internal air can flow out thereof, thus creating a forced air circulation through the headlights in the dynamic motor vehicle phase, which removes or prevents the formation of condensate and ice on the lenses thereof.

The second category includes those solutions in which the headlights are defogged and defrosted by a forced air flow obtained with the aid of the air conditioning system.

This second category includes, by way of example, the solution described in CN 102009640, wherein the headlights are fluidically connected to the air conditioning system through a suitable air supply circuit to cause a dehumidified air flow from the air conditioning system to be conveyed in the headlights and the air flowing out of them can be brought back to the air conditioning system, thus creating a forced air circulation through the headlights that removes or prevents the formation of condensate and ice in them.

This second category further includes the solution described in DE 10 2015 002246 A1, which discloses a lighting device for a motor vehicle comprising a vehicle lamp with at least one lamp for emitting light and a lamp housing where the at least one lamp is arranged and having an air inlet and an air outlet, and an air conditioner fluidically connected to the air inlet of the lamp housing and operable to provide the lamp housing with an airflow which enters the lamp housing through the air inlet and flows out of the lamp housing through the air outlet.

This second category further includes the solution described in DE 20 2016 105615 U1, which discloses a ventilation apparatus of a lamp module for vehicles may include a lamp housing, a lamp installed in the lamp housing and emitting light through a light transmitting part, a light transmitting lens covering an opening of the lamp housing and transmitting the light emitted from the light transmitting part, an intake hole part formed through the lamp housing and arranged at one side of the lamp, an exhaust hole part formed through the lamp housing and arranged at the other side of the lamp, an exhaust pipe coupled to the lamp housing and connected to the exhaust hole part, and an exhaust pump arranged outside the lamp housing, connected to the exhaust pipe, and operable to forcibly discharge the air between the lamp housing and the light transmitting lens through the exhaust pipe.

OBJECT AND SUMMARY OF THE INVENTION

The Applicant has noticed that the headlight defogging/defrosting technology based on a forced air flow produced with the aid of an air conditioning system is effective only when these system is operational, and, hence, this technology is completely useless just when it would be needed the most, namely when the motor vehicle is to be used after having been parked outdoors for a time sufficient to cause fogging and frosting of the headlights.

The object of the present invention is to improve the performance of the headlight defogging/defrosting technology based on a forced air flow compared to the currently proposed and used technologies.

According to the present invention, an automotive headlight defogging/defrosting system is provided, as claimed in the appended claims.

BRIEF DESCRIPTION OF THE DRAWINGS

The attached FIGURE shows a principle block diagram of an automotive headlight defogging/defrosting system.

DETAILED DESCRIPTION OF PREFERRED EMBODIMENTS OF THE INVENTION

The present invention will now be described in detail with reference to the attached FIGURE to allow a person skilled in the art to manufacture and use it. Various modifications to the described embodiments will be immediately apparent to those skilled in the art, and the described general principles may be applied to other embodiments and applications without departing from the scope of protection of the present invention as defined in the appended claims. Therefore, the present invention should not be regarded as limited to the embodiments described and shown, but should be granted the widest scope consistent with the features described and claimed.

The attached FIGURE shows a schematic block diagram of an automotive headlight defogging/defrosting system according to the present invention.

In particular, the attached FIGURE shows a motor vehicle 1 comprising two headlights 2, right and left, respectively, each provided with an air inlet and an air outlet (not shown) to allow air to flow in the headlights 2, and an air conditioning system 3 fluidically connected, on the one side, to a passenger compartment 4 of the motor vehicle 1 through a primary air supply circuit 5 operable to condition air in the passenger compartment 4 of the motor vehicle 1 in response to user settings made via a human-machine interface (not shown), and, on the other side, to the air inlets of the headlights 2 through a secondary air supply circuit 6 operable to supply an air flow into the headlights 2, the air outlets of which are connected to the external environment to cause air in the headlights 2 to flow out into the external environment, thus also preventing dust from entering the headlights 2.

The motor vehicle 1 further comprises a sensory system to measure physical quantities including, among others, air temperature and moisture outside the motor vehicle 1 and inside the headlights 2.

For this purpose, the sensory system essentially comprises one or a couple of external air temperature and moisture sensors 7, already provided on the motor vehicle 1 and typically arranged, respectively, inside the external rear view mirrors 8, and a couple of air temperature and moisture sensors 9 arranged inside the headlights 2.

The motor vehicle 1 further comprises a couple of electric heaters 10, in the form of resistors, each arranged inside a respective headlight 2, and whose electric power fails to create, when operated, optical distortions to the photometry of the headlights 2, and a couple of electric fans 11, each arranged inside a respective headlight 2.

The air conditioning system 3 comprises an electric fan 12 operable to produce an air flow in the primary and secondary air supply circuits 5, 6; an electric heater 13, in the form of a resistor, operable to heat the air flow produced by the electric fan 13; and an electronic control unit 14 connected to the electric fans 11, 12, to the electric heaters 10, 13 and to the sensory system 7, 9 to receive the measured quantities, and in particular air temperature and moisture inside the headlights 2 and outside the motor vehicle 1, as well as any further quantities indicative of the state of the motor vehicle systems/components, such as the state of electric charge of an electric battery 15 or battery pack of the motor vehicle 1, an operating status (on/off) of an internal combustion engine 16 of the motor vehicle 1, etc., as well as user settings of the air conditioning system 3 made via the human-machine interface, and programmed to implement a control software designed to control operation of the air conditioning system 3, of the electric fans 11, 12 and of the electric heaters 10, 13 to defog and defrost the headlights 2, as described in greater detail below.

In particular, the electronic control unit 14 is programmed to:
  detect impartation of a command to a centralized motor vehicle door unlocking/locking system via a mechanical or an electronic key (remote control) 17,
  determine the operating state of the internal combustion engine 16 of the motor vehicle 1 and the state of electric charge of the electric battery 15 or battery pack of the motor vehicle 1,
  carry out one or more of the following headlight defogging/defrosting interventions:
    a) operating, in a timed manner, when the internal combustion engine 16 is off, the electric fans 11 in the headlights 2 to cause air 2 to move in the headlights to such an extent to prevent moist air from stagnating and headlights 2 from fogging;
    b) operating, in a timed manner, when the internal combustion engine 16 is off, the electric heater 13 of the air conditioning system 3 and, simultaneously, the electric fan 12 of the air conditioning system 3 or the electric fans 11 in the headlights 2, to cause dehumidified air to flow into the headlights 2, and, resultingly, fogging thereof to be removed;
    c) operating, in a timed manner, the electric heaters 10 in the headlights 2.

Interventions in a), b) and c) are carried out by the electronic control unit 14 based on proprietary logics that are not part of the present invention and, therefore, will not be described in detail.

To this regard, however, it is indicated what follows.

First, interventions in a), b) and c) are carried out by the electronic control unit 14 based on air temperature and moisture inside the headlights 2.

Furthermore, interventions in a), b) and c) are carried out only when the state of electric charge of the electric battery 15 or battery pack) and the electric power absorption resulting from the interventions which are desired to be carried out allow the interventions to be carried out.

Moreover, intervention in c) is conveniently carried out in cold weather conditions, for example when external air temperature is lower than 0° C., and in particular in extremely cold weather conditions, for example when external air temperature is lower than −30° C., when ice condensation occurs on the inner and/or the outer surfaces of the lenses of the headlights 2, both in static conditions (resting) and in dynamic (moving) conditions of the motor vehicle 1.

Furthermore, in static conditions of the motor vehicle 1, intervention in c) is conveniently carried out in response to detection of impartation of a command to a centralized motor vehicle door unlocking/locking system, whereby starting defrosting of the condensate on the inner and/or the outer surfaces of the lenses of the headlights 2 and enhancing the effects resulting from the following interventions in a) and b), which can be activated manually by a user or automatically by the electronic control unit 14.

The foregoing description allows the advantages of the present invention to be appreciated.

In particular, the present invention allows liquid or iced condensate on the inner and/or outer surfaces of the lenses of the headlights to be removed or prevented from forming, also avoiding a copious entry of dust.

In fact, the present invention exploits on-vehicle components/systems already provided on motor vehicles, such as temperature/moisture sensors, electric fan and electric heater of the air conditioning system, and requires the provision of few additional components in the headlights, such as resistors and electric fans, compared to the previously proposed and used technologies.

The invention claimed is:

1. A motor vehicle comprising headlights and an air conditioning system fluidically connected to both a passenger cabin of the motor vehicle and the headlights to supply an air flow thereto, and comprising an electric fan to generate the air flow, an electric heater to heat the air flow generated by the electric fan, and an electronic control unit connected to the electric fan and to the electric heater of the air conditioning system to control operation thereof;
  characterized by further comprising a sensory system to measure air temperature and moisture inside the headlights, and an electric heater and an electric fan arranged inside each headlight;
  and in that the electronic control unit is further connected to the sensory system to receive the measured quantities and to the electric heaters and to the electric fans inside the headlights to control operation thereof, and is further designed to carry out one or more of the following headlight defogging/defrosting interventions based on air temperature and moisture in the headlights:

a) operating the electric fans in the headlights;

b) operating the electric heater of the air conditioning system and, simultaneously, the electric fan of the air conditioning system or the electric fans in the headlights;

c) operating the electric heaters in the headlights.

2. The motor vehicle according to claim 1, further comprising a centralized motor vehicle door unlocking/locking system; and wherein the electronic control unit is further designed to:

detect impartation of a command to the centralized motor vehicle door unlocking/locking system, and carry out the intervention in c) in response to the detection of a command to the centralized motor vehicle door unlocking/locking system.

3. The motor vehicle according to claim 2, wherein the electronic control unit is further designed to carry out intervention in c) in response to the detection of a command to the centralized motor vehicle door unlocking/locking system, and, sequentially, one of the interventions in a) and b) automatically or in response to a manual command from a user.

4. The motor vehicle according to claim 1, further comprising an internal combustion engine; and wherein the electronic control unit is further designed to:

determine an operating state of the internal combustion engine, and carry out interventions in a) and b) when the internal combustion engine is off.

5. The motor vehicle according to claim 1, further comprising an electric battery or an electric battery pack; and wherein the electronic control unit is further designed to:

determine an electric charge state of the electric battery or of the electric battery pack of the motor vehicle, and carry out interventions in a), b) and c) based on the electric charge state of the electric battery or of the electric battery pack and on an electric power absorption resulting from the intervention(s) to be carried out.

6. The motor vehicle according to claim 1, wherein the sensory system is further designed to measure air temperature and moisture outside the motor vehicle, and the electronic control unit is further designed to carry out intervention in c) when external air temperatures is lower than 0° C., and in particular lower than −30° C., and under static or dynamic motor vehicle conditions.

7. The motor vehicle according to claim 1, wherein the electronic control unit is further designed to carry out interventions in a), b) and c) in a timed manner.

* * * * *